May 31, 1955   G. M. GUSTIN   2,709,463
INSERT-SLOTTING ATTACHMENT FOR GANG RIP SAW
Filed March 18, 1953
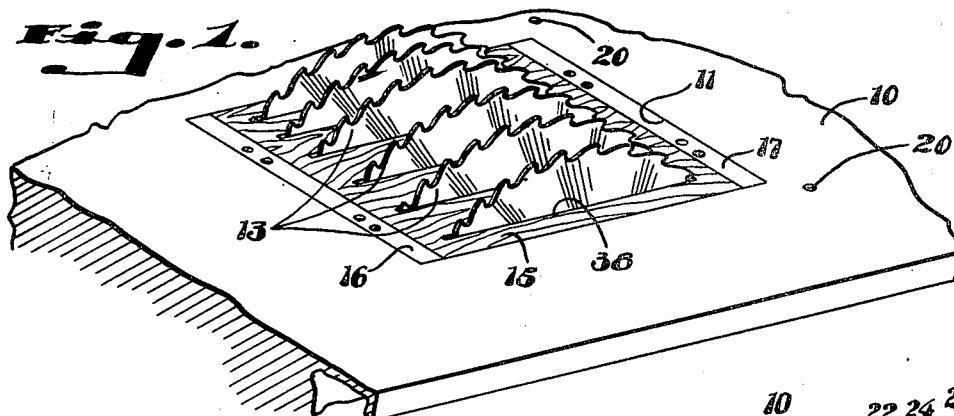
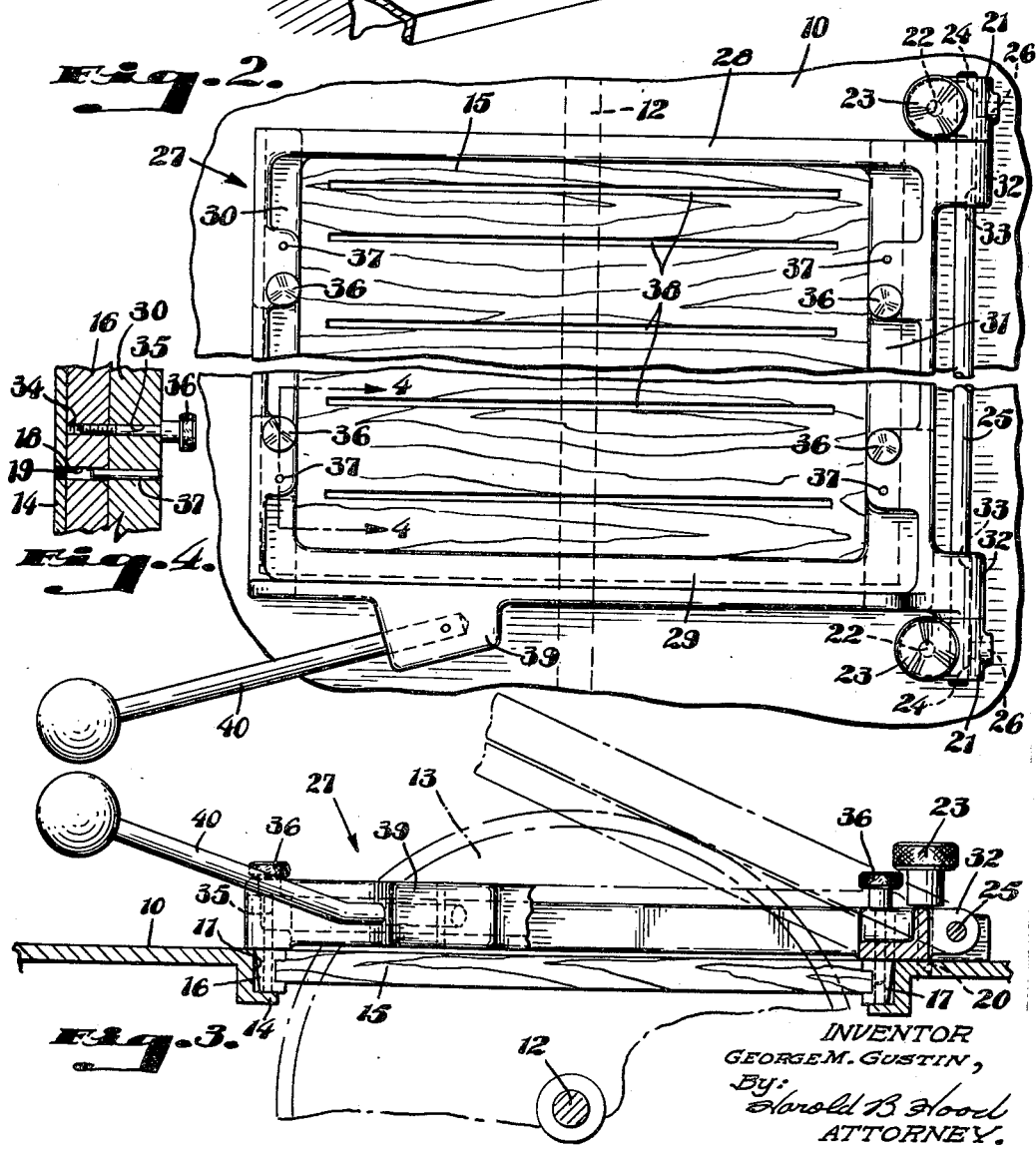
INVENTOR
GEORGE M. GUSTIN,
By: Harold B. Hood
ATTORNEY.

United States Patent Office 2,709,463
Patented May 31, 1955

2,709,463

INSERT-SLOTTING ATTACHMENT FOR GANG RIP SAW

George M. Gustin, Wabash, Ind., assignor to The G. M. Diehl Machine Works, Inc., Wabash, Ind., a corporation of Indiana Application March 18, 1953, Serial No. 343,202

7 Claims. (Cl. 143—58)

The present invention relates to rip saws and the like and particularly to the gang-type rip saw comprising a plurality of circular saws mounted on a common mandrel in axially spaced relation.

One form of a conventional, so-called gang rip saw comprises a table having a well opening through the top thereof and a plurality of circular saws mounted on a common mandrel and projecting from the well above the top of the table. A cover is provided for the well having a plurality of parallel slots therein, spaced according to the axial distance between the saw blades, the cover being seated in the well with the upper surface thereof substantially flush with the table top and with the saw blades projecting through said slots. The saw blades are axially adjustable along the mandrel in order to rip material into various widths, and with each such setting of the saws a different cover must be provided for the well. The covers are usually formed of wood, fiber, soft metals, or the like, and the slots are cut into the cover according to the spacing of the saws.

In one type of saw the table is fixed and, for the purpose of forming the slots in the cover element, the mandrel is movable vertically. To form the slots the mandrel is first lowered so that the saw blades clear the underside of the cover element; the cover element is fixed in place, and the mandrel is then raised while the saw blades are turning. This is not only a time-consuming operation but it also involves the expenditure of considerable effort on the part of the operator, since the combined weight of the mandrel assembly with its driving means, such as a large electric motor, is quite heavy.

In another type of saw, the mandrel is fixed and, for the purpose of forming slots in the cover element, the saw table is movable vertically. Such tables weigh as much as one thousand pounds, and this must be raised and then lowered with a blank cover element in place in the well in order to form the slots therein. Here again, much time and effort are involved.

In both of the above saw types, the table and mandrel are relatively movable. This inherently gives rise to a certain amount of vibration in the structure during operation of the saw, which, in turn, results frequently in unintended relative movement of the parts with resultant maladjustment and loss of precision in the work being performed.

To overcome these disadvantages, I prefer to journal the saw mandrel fixedly in the frame or base on which the mandrel-driving motor, the work table and the lower feed rolls over which the stock passes, are fixedly mounted, so that there can be no such relative movement as will produce a loss of precision. Ancillary means is then provided for guiding and carrying a cover element during the formation of the above-mentioned saw slots therein in a novel manner.

It is to the solution of these and other related problems that my invention is primarily directed. While my invention is principally concerned with gang saws in which the table and the mandrel axis are relatively immovable, it will be seen, as the description proceeds, that some of its advantages are attainable even in connection with other and more conventional forms of machines.

Briefly stated, my invention is primarily concerned with the provision of means whereby the requisite saw slots can be quickly and accurately formed in a well cover of the character above outlined, without relative movement between the mandrel axis and the work table, and without the need for any particular skill or the expenditure of an undue amount of time or effort on the part of the operator.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 1 is a fragmentary perspective view of a portion of a saw table showing the gang of saw blades projecting from a well therein through suitable slots in a cover for said well;

Fig. 2 is a plan view of a preferred form of my invention shown in its position for use on a saw table;

Fig. 3 is a side elevation of the device of Fig. 2, partially in section, and showing the details of mounting the device to a saw table; and Fig. 4 is a fragmentary sectional view taken substantially upon line 4—4 of Fig. 2 and showing the mounting details of the device.

Referring more particularly to the drawings, it will be seen that I have illustrated a more or less conventional saw comprising a table 10, having a well 11 opening through the top thereof. A mandrel 12 (Fig. 3) is journalled for rotation on the saw frame in a plane substantially parallel to the top of table 10 and a plurality of circular saws 13 are mounted on mandrel 12 in axially spaced relation and project through well 11 above the table top. The well is formed with an inwardly projecting lip 14 in a plane spaced downwardly from the table top and a cover member 15 is seated in well 11 upon the lip 14 with the upper surface of the cover member substantially flush with the table top. A plurality of slots 38 are formed in the cover element 15 spaced according to the axial distance between saws 13, and the saws project through said slots.

It is the formation of the slots 38 in cover 15 to which my invention is directed.

Basically, my invention involves the concept of supporting the cover element for movement in a path substantially transverse to the axis of the mandrel and, in the preferred form as illustrated, hinging the cover element 15 along one edge for swinging movement about an axis substantially parallel to mandrel 12 whereby the cover element, while blades 13 are rotating, can be slowly lowered into position in well 11 permitting the blades 13 to cut their own slots through the cover element 15. To this end, I provide reinforcing bars 16 and 17 extending along the opposite edges of cover 15, such bars being suitably fixed to cover 15 and seatable on the lip 14 to support the cover in well 11. These bars are provided with a plurality of bores 18 through which suitable screws may pass and take into tapped holes 19 in lip 14 to securely retain the cover in the well 11 after the slots have been formed therein in a manner now to be described.

Closely adjacent the corners of well 11 on the input side of the machine, I provide a pair of threaded holes 20. A pair of journal blocks 21, 21 are each provided with a first bore 22 through which projects a headed screw 23 taking into the hole 20 in table 10 whereby the blocks 21 can be securely, but removably, fixed to table 10. Each block is formed with a second bore 24 therein, substantially transverse to the bore 22 and blocks 21, 21 are so positioned on table 10 that the bores 24 are in substantial alignment. A shaft 25 has its opposite ends inserted in bores 24 and held against axial displacement therefrom by means of set screws 26, or the like.

The frame, referred to generally by the reference numeral 27, comprises side rails 28 and 29 and end rails 30 and 31. Rail 31 is provided with a pair of lugs 32, 32, each having a bore 33 therein upon a common axis, and the frame 27 is mounted for swinging movement by passing shaft 25 through bores 33, 33.

The bars 16 and 17 are provided with a plurality of threaded sockets 34, and rails 30 and 31 are provided with a like plurality of bores 35 registrable with sockets 34 when the frame 27 is in the position illustrated in Fig. 3. Through each bore 35, a screw 36 passes and is threadedly received in socket 34. Thus the cover 15 is securely, but removably, fixed to frame 27. Rails 30 and 31 are further provided with a plurality of pins 37 registrable with the bores 18 in the rails 16 and 17, and said pins will take into bores 18 to properly position cover 15 on frame 27 prior to its being placed in well 11.

After the saws 13 have been fixed in their desired position upon mandrel 12, the blocks 21, 21, supporting frame 27, are fixed on table 10 by means of screws 23, 23. A blank cover 15 is then mounted on frame 27 by means of screws 36. Blades 13 are set in motion and the frame 27 is swung from a position more or less perpendicular to the table 10 to its solid line position illustrated in Fig. 3. In that position, each blade will have cut its own slot 38 through the cover 15 and the cover will have seated itself in well 11 upon lip 14. A lug 39 is provided on frame 27 and supports a handle 40. By means of the handle 40 the frame may be swung up and down about the shaft 25 to insure that the saws 13 have cut clean slots 38 through the cover 15. Thereafter the screws 36 and the screws 23 are turned to permit the removal of frame 27 from cover 15 and the removal of blocks 21, 21 from table 10. Thereafter suitable screws are inserted through bores 18 in the bars 16 and 17 taking into the threaded holes 19 in lip 14.

Clearly, the use of such a device not only insures the proper formation of the slots 38 in such a cover, but permits such a formation in a fraction of the time and with a fraction of the effort heretofore required on the part of the operator. It also permits the mandrel and the saw table to be firmly mounted on a solid base thereby eliminating the vibration caused by the relatively movable mounting of these parts in the conventional saws of this type.

I claim as my invention:

1. For use with a gang rip saw comprising a table having a well opening through the top thereof, a mandrel mounted to rotate on an axis substantially parallel to the plane of said table top but spaced downwardly therefrom, a plurality of circular saws mounted on said mandrel in axially spaced relation and disposed to project from said well above said table top, and a cover for said well seated therein with the top of said cover substantially in the plane of said table top and having slots therein through which said circular saws project, the invention which includes means for holding said cover as it is moved to operative relationship in the well in said table top so as to accurately form the slots in said cover, said means comprising hinge means, means releasably fixing said hinge means to said table top adjacent said well with the axis thereof substantially parallel to the axis of said mandrel, and means for releasably supporting said cover on said hinge means and for swinging said cover about the axis of said hinge means from a position in which said cover is supported above said saws to a position in which said cover is seated in said well, whereby said saws cut through said cover to form said slots therein as said cover is moved from its first said position to its second said position.

2. For use with a gang rip saw comprising a table having a well opening through the top thereof, a mandrel mounted to rotate on an axis substantially parallel to the plane of said table top but spaced downwardly therefrom, a plurality of circular saws mounted on said mandrel in axially spaced relation and disposed to project from said well above said table top, and a cover for said well seated therein with the top of said cover substantially in the plane of said table top and having slots therein through which said circular saws project, the invention which includes means for holding said cover as it is moved to operative relationship in the well in said table top so as to accurately form the slots in said cover, said means comprising hinge means, means releasably fixing said hinge means to said table top adjacent said well with the axis thereof substantially parallel to the axis of said mandrel, a frame, means swingably mounting said frame to said hinge means, and means for releasably mounting said cover to said frame whereby said cover can be swung about the axis of said hinge means from a position in which said cover is supported above said saws to a position in which said cover is seated in said well, and said saws cut through said cover to form said slots therein as said cover is moved from its first said position to its second said position.

3. For use with a gang rip saw comprising a table having a well opening through the top thereof, a mandrel mounted to rotate on an axis substantially parallel to the plane of said table top but spaced downwardly therefrom, a plurality of circular saws mounted on said mandrel in axially spaced relation and disposed to project from said well above said table top, and a cover for said well seated therein with the top of said cover substantially in the plane of said table top and having slots therein through which said circular saws project, the invention which includes means for holding said cover as it is moved to operative relationship in the well in said table top so as to accurately form the slots in said cover, said means comprising a block, means for releasably fixing said block to said table top adjacent said well, pivot means carried by said block with the axis thereof substantially parallel to the axis of said mandrel, frame means mounted for swinging about the axis of said pivot means, and means for releasably fixing said cover to said frame means and for swinging of said cover about the axis of said pivot means from a position in which said cover is supported above said saws to a position in which said cover is seated in said well, whereby said saws cut through said cover to form said slots therein as said cover is moved from its first said position to its second said position.

4. For use with a gang rip saw comprising a table having a well opening through the top thereof, a mandrel mounted to rotate on an axis substantially parallel to the plane of said table top but spaced downwardly therefrom, a plurality of circular saws mounted on said mandrel in axially spaced relation and disposed to project from said well above said table top, and a cover for said well seated therein with the top of said cover substantially in the plane of said table top and having slots therein through which said circular saws project, the invention which includes means for forming the said slots in said cover comprising a pair of blocks each having a bore therethrough, means for releasably fixing said blocks, in spaced relation, to said table top near the edge of said well with said block bores lying substantially in a common axis substantially parallel to the axis of said mandrel, a shaft, means fixing said shaft in said block bores, a frame having a bore along one edge thereof said shaft passing through said bore to mount said frame for swinging movement about the axis of said shaft, and means for releasably mounting said cover on said frame whereby said cover can be swung about the axis of said shaft from a position in which said cover is substantially normal to the plane of said table top to a position in which said cover is seated in said well, said saws cutting through said cover to form said slots therein as said cover is moved from its first said position to its second said position.

5. For use with a gang rip saw comprising a table having a well opening through the top thereof, a mandrel mounted to rotate on an axis substantially parallel to the plane of said table top but spaced downwardly therefrom, a plurality of circular saws mounted on said mandrel in axially spaced relation and disposed to project from said well above said table top, and a cover for said well seated therein with the top of said cover substantially in the plane of said table top and having slots therein through which said circular saws project, the invention which includes means for forming the said slots in said cover comprising a pair of blocks each having a first bore therethrough, and a second bore therethrough substantially transverse to the axis of said first bore, screw means for each block passing through the said second bore and threadedly engaging in a tapped bore in said table top adjacent said well for releasably mounting said blocks in spaced relation on said table top with said first bores in substantial alignment, a shaft received at opposite ends in said first bore in each block, means fixing said shaft against axial displacement from said first bores, a frame comprising side rails and end rails supporting said side rails, one of said end rails being provided with a pair of lugs each having a bore therethrough substantially upon a common axis, said shaft passing through said bores to mount said frame for swinging movement about the axis of said shaft, and a plurality of screws carried by said frame and taking into threaded sockets in said cover to releasably mount said cover to said frame for swinging of said cover about the axis of said shaft from a position in which said cover is substantially normal to the plane of said table top to a position in which said cover is seated in said well, said saws cutting through said cover to form said slots therein as said cover is moved from its first said position to its second said position.

6. The device of claim 5 in which said cover includes reinforcing bars along two sides thereof, each having a plurality of bores therein for the passage of screws therethrough taking into tapped holes in said table to secure said cover in said well, said bars being formed to provide the said threaded sockets in said cover into which take the said screws carried by said frame, and said frame being further provided with aligning pins registrable with the said bores in said bars whereby the cover can be accurately positioned on said frame prior to its being moved from its first said position to its second said position.

7. The device of claim 5 including a handle carried by said frame and projecting therefrom out of the region occupied by said circular saws when said cover is in its second said position.

References Cited in the file of this patent
UNITED STATES PATENTS

| | | |
|---|---|---|
| Re. 17,942 | Pollard | Jan. 27, 1931 |
| 40,274 | Parkes | Oct. 13, 1863 |
| 448,163 | Paine | Mar. 10, 1891 |
| 2,544,175 | Oslund | Mar. 6, 1951 |